(12) United States Patent
Liu

(10) Patent No.: US 11,972,002 B2
(45) Date of Patent: Apr. 30, 2024

(54) METHOD OF LOGGING IN TO OPERATING SYSTEM, ELECTRONIC DEVICE AND READABLE STORAGE MEDIUM

(71) Applicant: HON HAI PRECISION INDUSTRY CO., LTD., New Taipei (TW)

(72) Inventor: Shiaw-Herng Liu, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 227 days.

(21) Appl. No.: 17/744,929

(22) Filed: May 16, 2022

(65) Prior Publication Data

US 2023/0087714 A1    Mar. 23, 2023

(30) Foreign Application Priority Data

Sep. 17, 2021  (CN) .......................... 202111095255.7

(51) Int. Cl.
| | |
|---|---|
| *G06F 21/60* | (2013.01) |
| *G06F 21/36* | (2013.01) |
| *G06F 21/62* | (2013.01) |
| *H04L 9/08* | (2006.01) |

(52) U.S. Cl.
CPC ............ *G06F 21/602* (2013.01); *G06F 21/36* (2013.01); *G06F 21/6218* (2013.01); *H04L 9/0825* (2013.01); *H04L 9/0866* (2013.01)

(58) Field of Classification Search
CPC ...... G06F 21/602; G06F 1/36; G06F 21/6218; G06F 21/64; G06F 21/31; H04L 9/0825; H04L 9/0866; H04L 9/3268; H04L 9/3271; H04L 9/50
See application file for complete search history.

(56) References Cited

U.S. PATENT DOCUMENTS

| | | | | |
|---|---|---|---|---|
| 11,146,552 | B1* | 10/2021 | Ferenczi | .................. G06F 21/44 |
| 2016/0119292 | A1* | 4/2016 | Kaseda | ................ H04L 63/045 |
| | | | | 713/165 |
| 2020/0127847 | A1* | 4/2020 | Yang | ..................... H04L 9/0877 |
| 2020/0210594 | A1* | 7/2020 | Talmor | ..................... G06F 21/64 |
| 2020/0401734 | A1* | 12/2020 | Murdoch | .............. H04L 9/0863 |
| 2021/0065267 | A1* | 3/2021 | Smith | ................ G06Q 20/4014 |
| 2021/0218574 | A1* | 7/2021 | Mao | ........................ H04L 63/04 |

FOREIGN PATENT DOCUMENTS

CN           111277577           6/2020

* cited by examiner

*Primary Examiner* — Han Yang
(74) *Attorney, Agent, or Firm* — ScienBiziP, P.C.

(57) ABSTRACT

A method of logging in to an operating system applied to an electronic device is provided. A distributed identity document corresponding to a login request is obtained by querying a blockchain in response to the login request. A target public key is extracted from the distributed identity document, and an encrypted first character string is obtained by encrypting a first character string using the target public key. The encrypted first character string is sent to the user terminal. Once a second character string is received from the user terminal, whether or not allow the user terminal to log in to the operating system is determined according to the first character string and the second character string.

20 Claims, 3 Drawing Sheets

METHOD OF LOGGING IN TO OPERATING SYSTEM, ELECTRONIC DEVICE AND READABLE STORAGE MEDIUM

FIELD

The present disclosure relates to information security technology, in particular to a method of logging in to an operating system, an electronic device, and a readable storage medium.

BACKGROUND

A computer in a public place is shared, an administrator of the shared computer creates a single user account in the shared computer and allows all users sharing this user account to operate the shared computer. In this situation, a leak of personal and private information to others may easily occur. For example, when a current user logs into a network mailbox on the shared computer, but fails to log out correctly when leaving, private information of the current user may be exposed to subsequent users. The current method of logging in to the shared computer has low security and can easily lead to information leakage.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
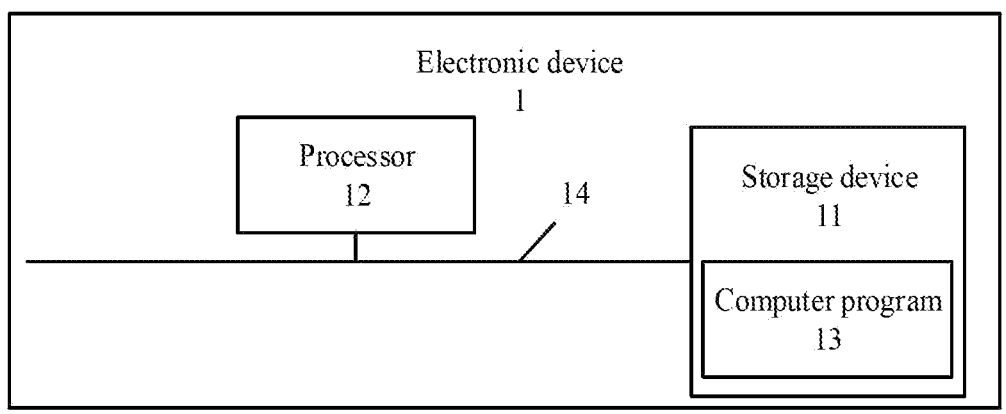
FIG. 1 is a structural diagram of an electronic device provided by an embodiment of the present disclosure.

FIG. 1 shows an electronic device according to an embodiment of the present disclosure. Referring to FIG. 1, the electronic device 1 includes, but is not limited to, a storage device 11 and at least one processor 12. The storage device 11 and at least one processor 12 are directly or indirectly connected through a bus (e.g., the storage device 11 and at least one processor 12 are directly connected through a bus 14 as shown in FIG. 1).

The electronic device 1 may be a computer, a mobile phone, a tablet computer, a personal digital assistant (PDA), or other device installed with application programs. Those skilled in the art can understand that FIG. 1 is only an example of the electronic device 1, and does not constitute a limitation on the electronic device 1. Other examples may include more or less components than the one shown, or combine some components, or have different components. For example, the electronic device 1 may also include input and output devices, network access devices, buses, and the like.

Figure 2:
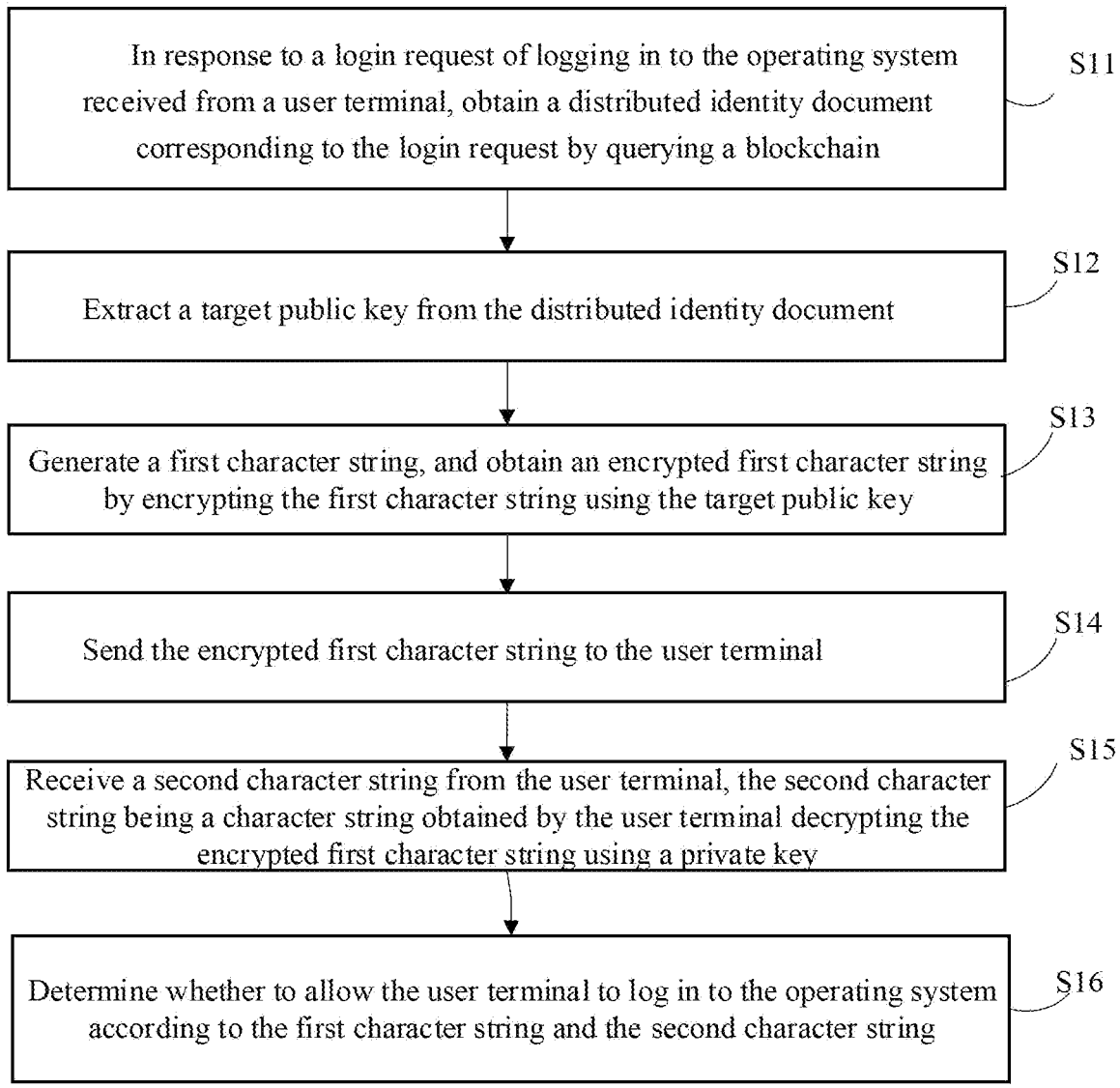
FIG. 2 is a flow chart of an embodiment of a method of logging in to an operating system according to the present disclosure.

FIG. 2 shows a preferred embodiment of a method of logging in to an operating system of the present disclosure. The method is applied in the electronic device 1. According to different requirements, the order of the blocks in this flowchart can be changed, and some steps can be omitted. In this embodiment, the method includes:

At block S11, in response to a login request of logging in to the operating system received from a user terminal, the electronic device 1 obtains a distributed identity document corresponding to the login request by querying a blockchain.

In this embodiment, decentralized Identifiers (DIDs) are identifiers composed of strings. A DID is used to represent a digital identity, and can achieve global uniqueness even without a central registration authority. Typically, a user entity can have a plurality of identities, each of which carries a unique DID value, and an asymmetric key associated with it. The asymmetric key includes a public key and a private key. There is no associated information between different identities, thus effectively protecting the security of users' personal data.

In this embodiment, the DID is a decentralized and verifiable digital identifier, which is distributed, autonomously controlled, and multiplexed across chains. The user entity can independently complete the DID registration, resolution, update, and revocation operations. The DID is specifically parsed into a DID document, and the DID document includes the unique identification code of the DID, the public key list and detailed information of the public key, and other attribute descriptions of the DID user. The unique identification code of the DID is a DID user account.

In this embodiment, the process of the electronic device 1 obtaining the distributed identity document corresponding to the login request by querying the blockchain includes:

(1) The electronic device 1 generates a quick response (QR) code of account login (herein after named as "account login QR code") and displays the account login QR code, in response to the login request. In one embodiment, a user sends the login request through the user terminal. When the electronic device 1 receives the login request, the electronic device 1 invokes a second Application Programming Interface (API) that is logged using a distributed ID account, and generates the account login QR code according to the second API interface. For example, the second API interface is {"protocol": "http", "api_endpoint": "http://192.168.1.10:8080/user/login"}.

(2) The electronic device 1 receives a second account from the user terminal, the second account is generated by the user terminal by scanning the account login QR code. In specific implementation, after the user scans the account login QR code through the user terminal, the user can input a second DID string through the second API interface, and set the second DID string as the second account. The second account is a login account of the user, which can be input according to actual needs of the user. After the input is completed, the user terminal sends the second account to the operating system.

(3) The electronic device 1 obtains the distributed identity document corresponding to the second account by querying the blockchain.

In some embodiments, before the block S11, the electronic device 1 further performs the following actions: in response to a registration request for registering a DID account received from the user terminal, generating and displaying a QR code of account registration (hereinafter named as "DID account registration QR code"); receiving from the user terminal a first account that is generated by the user terminal by scanning the DID account registration QR code; and writing the first account into the distributed identity document.

In order for the user to log in to the operating system with a distributed identity, the user needs to register an account, and the account registered by the user should be stored in the DID file.

In specific implementation, the user can send the registration request to the electronic device 1 through the user terminal. When the electronic device 1 receives the registration request, the electronic device 1 can invoke a first API interface that is used for DID account registration according to the registration request, and can generate and display the DID account registration QR code according to the first API interface. The user scans the DID account registration QR code through the user terminal, and the DID account registration QR code connects the user terminal to the first API interface. The user can input a first DID string on the first API interface, the first DID string is a user account created by the user, wherein the first DID string can be set according to the actual needs of the user, and the first DID string can be as the first account. For example, the user sends a registration request to a shared computer in a library through the library's official website. After the shared computer receives the registration request, the shared computer generates a DID account registration QR code, and the user scans the DID account registration QR code, enters an interface for account registration of the library shared computer, and enters "did:example:123456789abcdefg" as the first account in the interface. After the first account is received by the electronic device 1, the first account is written into the DID file pre-stored on the blockchain.

It should be noted that the blockchain provides data storage in a decentralized manner by storing data in a series of data blocks that have a priority relationship with each other, which improves the security of data.

By establishing the DID file and writing the user's DID account into the DID file, data security and immutability are ensured.

In some embodiments, the electronic device 1 further performs the following actions: receiving a public key from the user terminal, wherein the public key is generated by encrypting the first account by the user terminal, and the public key corresponds to the private key; writing the public key into the distributed identity document and associating the public key with the first account.

In specific implementation, the user terminal encrypts the first account by using an asymmetric encryption algorithm, and the asymmetric algorithm can be set according to the actual needs of the user. After encrypting the first account, the user terminal obtains a pair of keys, a public key and a private key corresponding to the first account. The public key is written into the distributed identity document and associated with the first account. Wherein, the private key is used to decrypt the character string, which is stored by the user and is not and should not be transmitted to other devices. The public key is used to encrypt the character string and can be disclosed to the outside world. It should be noted that, after encryption is performed on a file using the public key, only the paired private key can decrypt the file that has been encrypted.

By using the public key and the private key that are generated according to the first account, the public key and the private key form a unique relationship. Based on this unique corresponding relationship, it is convenient for subsequent authentication of the user's identity. At the same time, by writing the public key into the DID file and establishing an association with the first account, each user account corresponds to a public key, thereby ensuring a reliability of user identity information.

At block S12, the electronic device extracts a target public key from the distributed identity document.

In this embodiment, the extraction of the target public key from the distributed identification document includes: traversing the distributed identification document; searching for a first account that is the same as the second account; setting the public key corresponding to the first account as the target public key.

In this manner of implementation, since a unique correspondence is established between the user account, the public key, and the private key, it can be determined whether the user has the right to log in to the operating system by searching for the unique public key corresponding to the second account.

At block S13, the electronic device 1 generates a first character string, and obtains an encrypted first character string by encrypting the first character string using the target public key.

In order to subsequently use the private key to verify the identity of the user logging in to the operating system, the first character string needs to be generated randomly, and the target public key is used to encrypt the first character string.

In this embodiment, the first character string is randomly generated by the electronic device 1.

In this embodiment, the encryption of the first character string using the target public key includes: setting the target public key as an encryption key; encrypting the first character string using an asymmetric encryption algorithm by using the encryption key, where the asymmetric encryption algorithm can be set according to the actual needs of the user. For example, the asymmetric encryption algorithm can be Elliptic Curves Cryptography (ECC).

At block S14, the electronic device 1 sends the encrypted first character string to the user terminal.

In this embodiment, since the private key is stored by the user terminal, the encrypted first character string needs to be sent to the user terminal.

At block S15, the electronic device 1 receives a second character string sent by the user terminal, where the second character string is a character string obtained by the user terminal decrypting the encrypted first character string using the private key.

In this embodiment, after receiving the encrypted first character string, the user terminal uses the private key as a decryption key, and uses the asymmetric decryption algorithm to perform a decryption operation on the encrypted first character string, thereby obtaining the second string.

At block S16, the electronic device determines whether the user terminal is allowed to log in to the operating system according to the first character string and the second character string.

In this embodiment, whether the user identity is legal can be determined by comparing whether the first character string and the second character string are the same. When the first character string and the second character string are the same, it means that the private key of the user terminal and the target public key are in a corresponding relationship, that is, the private key does correspond to the second account. When the first character string and the second character string are different, it means that the private key of the user terminal does not correspond to the target public key, nor does the private key correspond to the second account, so the second account is illegal.

In this embodiment, determining whether or not to allow the user terminal to log in to the operating system according to the first character string and the second character string includes: determining whether the first character string and the second character string are same; allowing the user terminal to log in to the operating system if the first character string is the same as the second character string: not allowing the user terminal to login to the operating system if the first character string is different from the second character string.

By establishing a unique correspondence between the user account, the private key, and the public key, and using the correspondence to verify the user's identity, the user's account can be safeguarded, and the security of content on the operating system can also be guaranteed.

Figure 3:
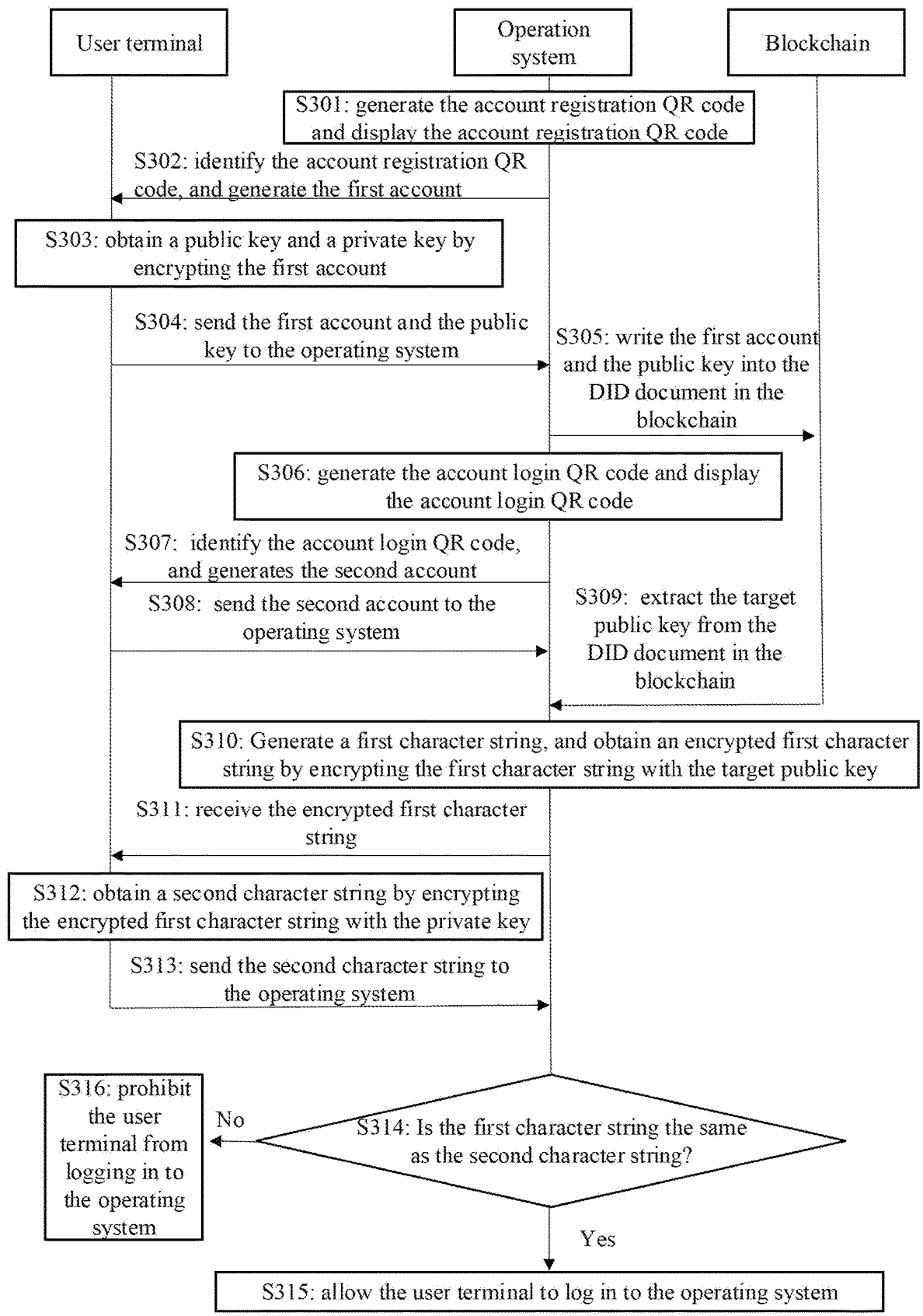
FIG. 3 is a data flow diagram of an embodiment of a method of logging in to an operating system according to the present disclosure.

FIG. 3 shows a method of logging in to an operating system provided by an embodiment of the present disclosure. According to different requirements, the order of blocks in this data flow diagram can be changed, and some blocks can be omitted. The execution body of the operating system login method may be the operating system.

At block S301, the operating system generates the account registration QR code and displays the account registration QR code.

At block S302, the user terminal identifies the account registration QR code, and generates the first account.

At block S303, the user terminal obtains a public key and a private key by encrypting the first account.

At block S304, the user terminal sends the first account and the public key to the operating system.

At block S305, the operating system writes the first account and the public key into the DID document in the blockchain.

At block S306, the operating system generates the account login QR code and displays the account login QR code.

At block S307, the user terminal identifies the account login QR code, and generates the second account.

At block S308, the user terminal sends the second account to the operating system.

At block S309, the operating system extracts the target public key from the DID document in the blockchain.

At block S310, the operating system generates a first character string, and obtains an encrypted first character string by encrypting the first character string with the target public key.

At block S311, the user terminal receives the encrypted first character string.

At block S312, the user terminal obtains a second character string by encrypting the encrypted first character string with the private key.

At block S313, the user terminal sends the second character string to the operating system.

At block S314, the operating system determines whether the first character string is the same as the second character string.

At block S315, when the first character string is the same as the second character string, the operating system allows the user terminal to log in to the operating system.

At block S316, when the first character string is different from the second character string, the operating system does not allow the user terminal to login to the operating system.

It should be understood that the described embodiments are for illustrative purposes only, and are not limited by this structure in the scope of the claims.

Referring to FIG. 1 again, it should be understood by those skilled in the art that the structure of the electronic device 1 shown in FIG. 1 does not constitute a limitation of the embodiment of the present disclosure. In other examples, the electronic device 1 may further include other hardware or software, or the electronic device 1 may have different component arrangements.

In at least one embodiment, the electronic device 1 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the electronic device 1 is merely an example, and other existing or future electronic products may be included in the scope of the present disclosure, and are included in the reference.

In some embodiments, the storage device 11 can be used to store program codes of computer readable programs and various data, such as the computer program 13 installed in the electronic device 1, and automatically access the programs or data with high speed during the running of the electronic device 1. The storage device 11 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the electronic device 1 that can be used to carry or store data.

The program codes and various data in the storage device 11 can be stored in a computer-readable storage medium if they are implemented in the form of software functional units and sold or used as independent products. Based on this understanding, the present disclosure implements all or part of the processes in the methods of the above embodiments, such as the blocks in the method of logging in to the operating system, which can also be completed by instructing relevant hardware through the computer program 13. The computer program 13 may be stored in a computer-readable storage medium, and when executed by the processor, the computer program 13 may implement the blocks of the foregoing method embodiments. The computer program 13 can include computer program code, and the computer program code may be in the form of source code, object code, executable file, or some intermediate form, and the like. The computer-readable medium may include: any entity or device capable of carrying the computer program code, recording medium, U disk, removable hard disk, magnetic disk, optical disk, computer memory, and read-only memory (ROM, Read-Only Memory).

In some embodiments, the at least one processor 12 may be composed of an integrated circuit, for example, may be composed of a single packaged integrated circuit, or multiple integrated circuits of same function or different functions. The at least one processor 12 can include one or more central processing units (CPU), a microprocessor, a digital processing chip, a graphics processor, and various control chips. The at least one processor 12 is a control unit of the electronic device 1, which connects various components of the electronic device 1 using various interfaces and lines. By running or executing a computer program or modules stored in the storage device 11, and by invoking the data stored in the storage device 11, the at least one processor 12 can perform various functions of the electronic device 1 and process data of the electronic device 1. For example, the processor 12 may perform the function of logging in to the operating system as shown in FIG. 2.

Although not shown, the electronic device 1 may further include a power supply (such as a battery) for powering various components. Preferably, the power supply may be logically connected to the at least one processor 12 through a power management device, thereby, the power management device manages functions such as charging, discharging, and power management. The power supply may include one or more DC or AC power sources, a recharging device, a power failure detection circuit, a power converter or inverter, a power status indicator, and the like. The electronic device 1 may further include various sensors, such as a BLUETOOTH module, a WI-FI module, and the like, and details are not described herein.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method of logging in to an operating system applied to an electronic device, the method comprising:
   in response to a login request of logging in to the operating system from a user terminal, obtaining a distributed identity document corresponding to the login request by querying a blockchain;
   extracting a target public key from the distributed identity document;
   generating a first character string, and obtaining an encrypted first character string by encrypting the first character string using the target public key;
   sending the encrypted first character string to the user terminal;
   receiving a second character string from the user terminal, the second character string being a character string obtained by the user terminal decrypting the encrypted first character string using a private key; and
   determining whether to allow the user terminal to log in to the operating system according to the first character string and the second character string.

2. The method as claimed in claim 1, further comprising:
   in response to a registration request from the user terminal, generating and displaying an account registration quick response (QR) code;
   receiving from the user terminal a first account that is generated by the user terminal by scanning the account registration QR code; and
   writing the first account into the distributed identity document.

3. The method as claimed in claim 2, further comprising:
   receiving a public key from the user terminal, the public key being generated by encrypting the first account by the user terminal, and the public key being corresponding to the private key; and
   writing the public key into the distributed identity document and associating the public key with the first account.

4. The method as claimed in claim 2, further comprising:
   invoking a first application programming interface (API); and
   generating and displaying the account registration QR code according to the first API interface.

5. The method as claimed in claim 2, wherein obtaining the distributed identity document corresponding to the login request by querying the blockchain comprises:
   generating the account login QR code and displaying the account login QR code, in response to the login request;
   receiving a second account from the user terminal, the second account being generated by the user terminal by scanning the account login QR code; and
   obtaining the distributed identity document corresponding to the second account by querying the blockchain.

6. The method as claimed in claim 5, wherein extracting the target public key from the distributed identification document comprises:
   traversing the distributed identification document;
   searching for a first account that is the same as the second account; and
   setting the public key corresponding to the first account as the target public key.

7. The method as claimed in claim 6, wherein encrypting the first character string using the target public key comprises:
   setting the target public key as an encryption key; and
   encrypting the first character string using an asymmetric encryption algorithm by using the encryption key.

8. The method as claimed in claim 1, wherein determining whether to allow the user terminal to log in to the operating system according to the first character string and the second character string comprises:
   determining whether the first character string is the same with the second character string;
   allowing the user terminal to log in to the operating system in response that the first character string is the same with the second character string; and
   prohibiting the user terminal from logging in to the operating system in response that the first character string is different from the second character string.

9. An electronic device comprising:
   a storage device;
   at least one processor; and
   the storage device storing one or more programs, which when executed by the at least one processor, cause the at least one processor to:
   in response to a login request of logging in to the operating system from a user terminal, obtain a distributed identity document corresponding to the login request by querying a blockchain;
   extract a target public key from the distributed identity document;
   generate a first character string, and obtain an encrypted first character string by encrypting the first character string using the target public key;
   send the encrypted first character string to the user terminal;
   receive a second character string from the user terminal, the second character string being a character string obtained by the user terminal decrypting the encrypted first character string using a private key; and determine whether to allow the user terminal to log in to the operating system according to the first character string and the second character string.

10. The electronic device as claimed in claim 9, wherein the at least one processor is further caused to:

in response to a registration request from the user terminal, generate and display an account registration quick response (QR) code;

receive from the user terminal a first account that is generated by the user terminal by scanning the account registration QR code; and write the first account into the distributed identity document.

11. The electronic device as claimed in claim 10, wherein the at least one processor is further caused to:

receive a public key from the user terminal, the public key being generated by encrypting the first account by the user terminal, and the public key being corresponding to the private key, and write the public key into the distributed identity document and associate the public key with the first account.

12. The electronic device as claimed in claim 10, wherein the at least one processor is further caused to:

invoke a first application programming interface (API); and generate and display the account registration QR code according to the first API interface.

13. The electronic device as claimed in claim 10, wherein the at least one processor obtains the distributed identity document corresponding to the login request by querying the blockchain by:

generating the account login QR code and displaying the account login QR code, in response to the login request;

receiving a second account from the user terminal, the second account being generated by the user terminal by scanning the account login QR code; and obtaining the distributed identity document corresponding to the second account by querying the blockchain.

14. The electronic device as claimed in claim 13, wherein the at least one processor extracts the target public key from the distributed identification document by:

traversing the distributed identification document;

searching for a first account that is the same as the second account; and setting the public key corresponding to the first account as the target public key.

15. The electronic device as claimed in claim 14, wherein the at least one processor encrypts the first character string using the target public key by:

setting the target public key as an encryption key; and encrypting the first character string using an asymmetric encryption algorithm by using the encryption key.

16. The electronic device as claimed in claim 9, wherein the at least one processor determines whether to allow the user terminal to log in to the operating system according to the first character string and the second character string by:

determining whether the first character string and the second character string are same;

allowing the user terminal to log in to the operating system in response that the first character string is the same as the second character string; and prohibiting the user terminal from logging in to the operating system in response that the first character string is different from the second character string.

17. A non-transitory storage medium having stored thereon at least one computer-readable instructions, which when executed by a processor of an electronic device, causes the processor to perform a method of logging in to an operating system, wherein the method comprises:

in response to a login request of logging in to the operating system from a user terminal, obtaining a distributed identity document corresponding to the login request by querying a blockchain;

extracting a target public key from the distributed identity document;

generating a first character string, and obtaining an encrypted first character string by encrypting the first character string using the target public key;

sending the encrypted first character string to the user terminal;

receiving a second character string from the user terminal, the second character string being a character string obtained by the user terminal decrypting the encrypted first character string using a private key; and determining whether to allow the user terminal to log in to the operating system according to the first character string and the second character string.

18. The non-transitory storage medium as claimed in claim 17, wherein the method further comprises:

in response to a registration request from the user terminal, generating and displaying an account registration quick response (QR) code;

receiving from the user terminal a first account that is generated by the user terminal by scanning the account registration QR code; and writing the first account into the distributed identity document.

19. The non-transitory storage medium as claimed in claim 18, wherein the method further comprises:

receiving a public key from the user terminal, the public key being generated by encrypting the first account by the user terminal, and the public key being corresponding to the private key; and writing the public key into the distributed identity document and associating the public key with the first account.

20. The non-transitory storage medium as claimed in claim 19, wherein the method further comprises:

invoking a first application programming interface (API); and generating and displaying the account registration QR code according to the first API interface.

* * * * *